United States Patent [19]

Mrotek et al.

[11] Patent Number: 5,132,175
[45] Date of Patent: Jul. 21, 1992

[54] BATTERY VENT CAP

[75] Inventors: Edward N. Mrotek, Grafton, Wis.; Terry W. Joyce, Villa Hills, Ky.; Bella Gorelik, Whitefish Bay, Wis.

[73] Assignee: Globe-Union Inc., Milwaukee, Wis.

[21] Appl. No.: 541,921

[22] Filed: Jun. 21, 1990

Related U.S. Application Data

[63] Continuation-in-part of Ser. No. 365,084, Jun. 12, 1989, Pat. No. 5,002,840.

[51] Int. Cl.⁵ .............................. H01M 2/12
[52] U.S. Cl. .......................... 429/86; 29/87; 29/89
[58] Field of Search .............. 429/82, 86, 89, 87, 429/88

[56] References Cited

U.S. PATENT DOCUMENTS

| | | | |
|---|---|---|---|
| 3,879,227 | 4/1975 | Hennen | 429/88 X |
| 4,002,495 | 1/1977 | Hakarine | 429/87 |
| 4,463,069 | 7/1984 | Greenlee | 429/86 |
| 4,486,516 | 12/1984 | Poe | 429/82 |
| 4,636,446 | 1/1987 | Lee | 429/86 X |
| 4,778,735 | 10/1988 | Shestok et al. | 429/82 |
| 4,891,270 | 1/1990 | Jergl et al. | 429/88 X |
| 4,916,034 | 4/1990 | Hulsebus et al. | 429/86 |

Primary Examiner—Anthony Skapars
Attorney, Agent, or Firm—Foley & Lardner

[57] ABSTRACT

A vent cap includes a hollow vent cover which is inserted into a battery vent hole and a flange which retains the vent cap from overinsertion into the vent hole. An aperture near the top of the vent cap communicates with the hollow interior of the vent cover and forms an exhaust path for discharge of gases from within the battery. A flame protection device, for example, a microporous disc, is disposed within the vent cover so that gases must pass through the disc in order to exit the battery through the aperture. A splash guard may be provided in the vent cover to reduce electrolyte leakage into the exhaust path and onto the flame arrestor, thereby inhibiting electrolyte leakage from the battery.

17 Claims, 6 Drawing Sheets

BATTERY VENT CAP

This application is a continuation-in-part of U.S. Ser. No. 365,084, filed Jun. 12, 1989, now U.S. Pat. No. 5,002,840.

BACKGROUND OF THE INVENTION

1. Technical Field

This invention relates to vent caps used in automotive batteries, particularly to vent caps used to control the discharge of gases from the battery and prevent the introduction of flames, sparks, and other ignition sources into the battery.

2. Background Art and Technical Problems

Conventional lead-acid vehicle batteries comprise a number of cells disposed in a container. A series of alternating positive and negative electrodes (plates), having separators sandwiched therebetween, are disposed in each cell and immersed in aqueous sulfuric acid electrolyte. The positive plate contains lead oxide disposed on a lead alloy grid. The negative plate contains lead as the electroactive material on a lead alloy grid.

The electromotive potential of each battery cell is determined by the chemical composition of the electroactive substrates employed in the electrochemical reaction. For the lead-acid chemistry described above, the voltaic potential is approximately two volts per cell, regardless of cell volume. Vehicles manufactured by original equipment manufactuers (OEM's) typically require a twelve volt battery. Thus, each such battery advantageously comprises six cells (6 cells×2 volts/cell=12 volts). In addition, OEM vehicles are configured for a battery having a conventional envelope, i.e., the external dimensions of the battery match the space provided for the battery within the OEM vehicle.

In lead-acid batteries, gases are often liberated from the electrolyte during the charge and discharge reactions. Factors such as high current charge and discharge conditions, and changes in temperature, can affect the rate at which these gases are produced. To avoid excessive gas pressure buildup which can lead to electrolyte leaks, housing failure, and possibly explosion, it is desirable to vent the high pressure regions within the battery. Due to the volatile nature of these gases, it is desirable to provide a mechanism for preventing an external flame from entering the battery through the gas exhaust vent.

Presently known batteries employ exhaust conduits which provide gaseous communication between each battery cell and the outside of the battery. Various configurations have been employed in prior art batteries to minimize electrolyte leakage from the battery. Known venting configurations typically vent the gases at a location on the battery housing cover remote from the cell fill holes. For example, a labyrinth (a zig-zag shaped conduit) has been employed to maintain gaseous communication between the battery cells and the external battery environment, the gas exhaust aperture being disposed proximate a lengthwise edge of the battery. See generally Hulsebus et al. U.S. Pat. No. 4,916,034, issued Apr. 10, 1990, and Henning U.S. Pat. No. 3,879,227, issued Apr. 22, 1975.

The labyrinth prevents the liquid from leaving the battery while allowing gas to exit the battery through a porous flame arrestor disposed in the labyrinth path proximate the exhaust aperture. However, the relatively small cross-sectional area of the labyrinth tends to produce condensation of the gases, which condensation is deposited on the flame arrestor. In systems wherein the gases are exhausted downwardly through the flame arrestor, the condensation is often pumped through the labyrinth to the flame arrestor and thereafter through the flame arrestor to the outside of the battery, resulting in electrolyte loss.

An apparatus is needed which minimizes the possibility of electrolyte leakage from the battery, inhibits the introduction of flame into the battery, directs gases from the battery, and which is economical to manufacture.

SUMMARY OF THE INVENTION

The present invention provides a vent cap having a typically barrel-shaped, hollow vent cover which is inserted into a battery vent hole, and a top flange portion which retains the vent cap from overinsertion into the vent hole. An aperture near the top of the vent cap communicates with the hollow interior of the vent cover and forms an exhaust path for discharge of gases from within the battery. A flame protection device, for example, a microporous disc, is disposed within the vent cover so that gases must pass through the disc in order to exit the battery through the aperture in the flange. A splash guard may be provided in the vent cover to reduce electrolyte leakage into the exhaust path and onto the flame arrestor, thereby inhibiting electrolyte leakage from the battery.

The foregoing advantages are accomplished in a preferred embodiment of the invention by providing a cup-shaped holder for receiving a disc-shaped flame arrestor. The flame arrestor may be sonically welded to the holder, and the assembled holder and arrestor may be sonically welded to the vent cap, thereby providing a leak free exhaust path from the battery while preventing flames from entering the battery.

The present invention further provides a multiple vent cap of unitary construction including a top flange uniting a plurality of vent covers extending downwardly therefrom for disposition within a plurality of corresponding battery fill holes. The covers maintain gaseous communication between two or more cells and a common manifold formed in the flange. The exhaust aperture may be disposed at one end of the vent cap. The covers and the common manifold cooperate to define a gas discharge path from the cells to the aperture. A flame protection device may be disposed within one or more of the covers such that all gases must pass upwardly through the disc before exiting the battery.

BRIEF DESCRIPTION OF THE DRAWING

Preferred exemplary embodiments of the invention will hereinafter be described in conjunction with the appended drawing, wherein like numerals denote like elements, and.

DETAILED DESCRIPTION OF PREFERRED EXEMPLARY EMBODIMENTS

The vent cap of the present invention is discussed herein in the context of a dual battery, i.e., a battery housing having respective main and reserve batteries disposed therein. Such a dual battery is described in detail in U.S. patent application Ser. No. 07/365,084, filed Jun. 12, 1989, the entire contents of which are hereby incorporated herein by reference. Those skilled in the art will appreciate that the subject vent cap may be used in conjunction with any suitable battery, for example, a conventional single automotive battery.

Figure 1:
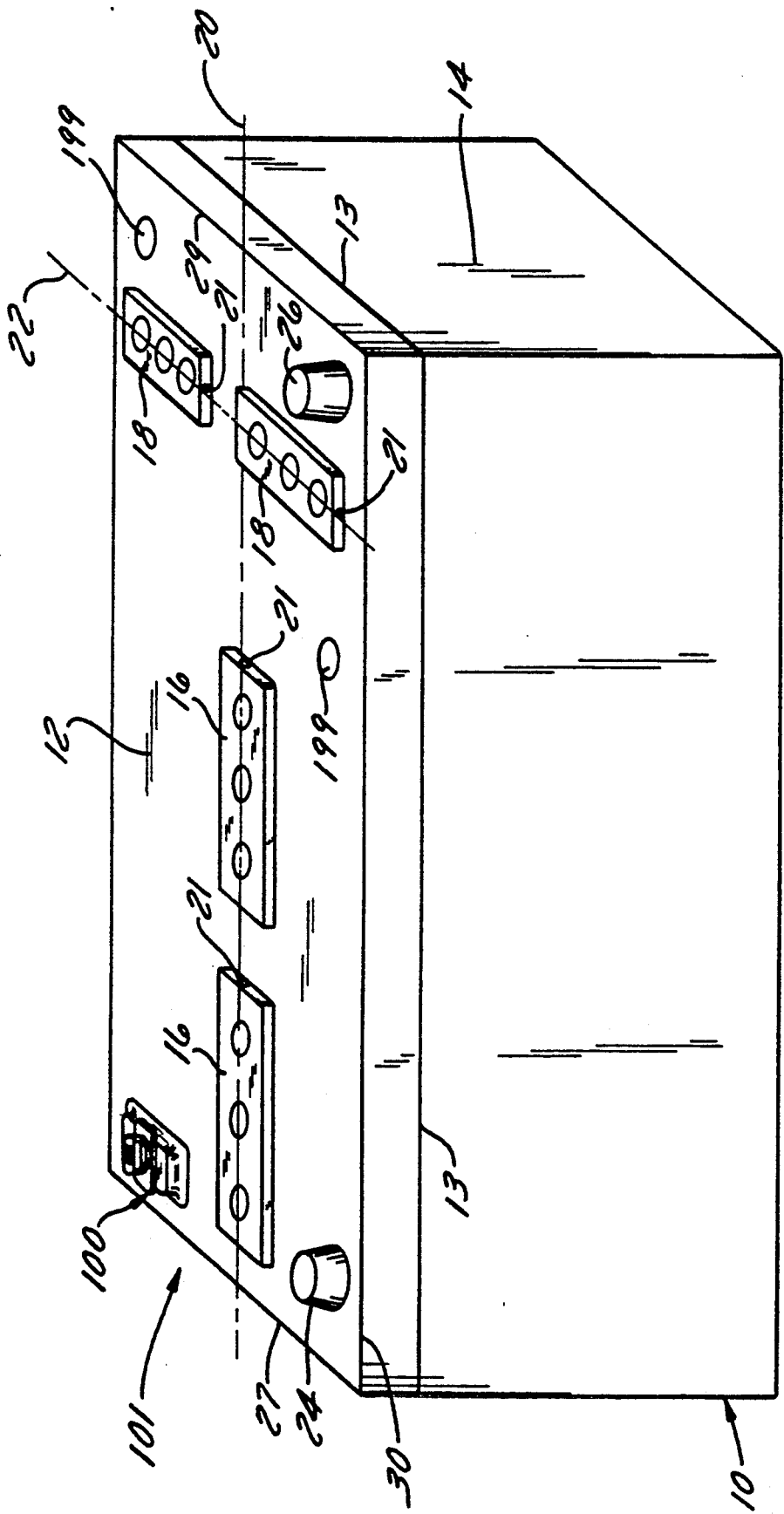
FIG. 1 is a perspective view of a battery having several vent caps according to the invention.
Figure 2:
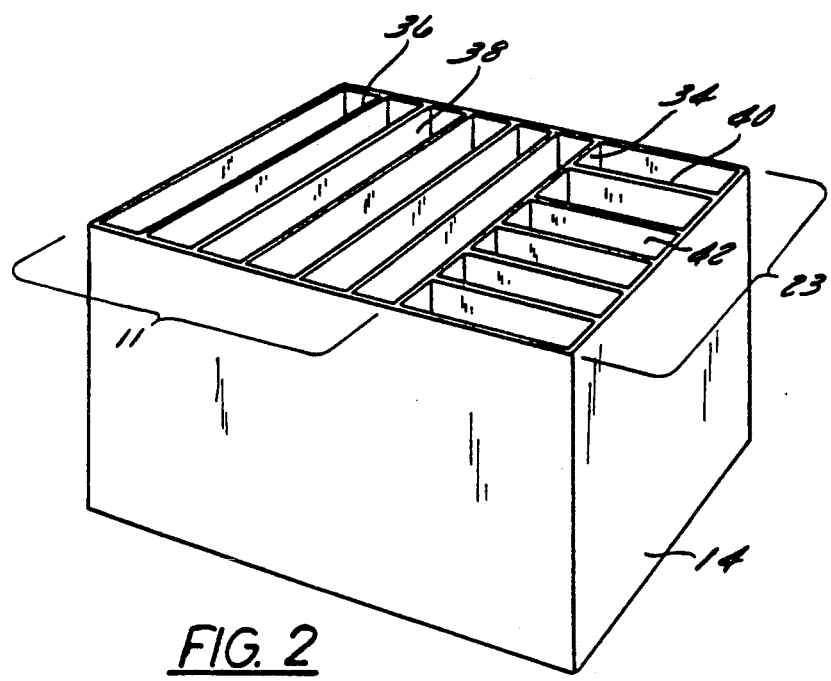
FIG. 2 is a perspective view of the battery container shown in FIG. 1.
Figure 3:
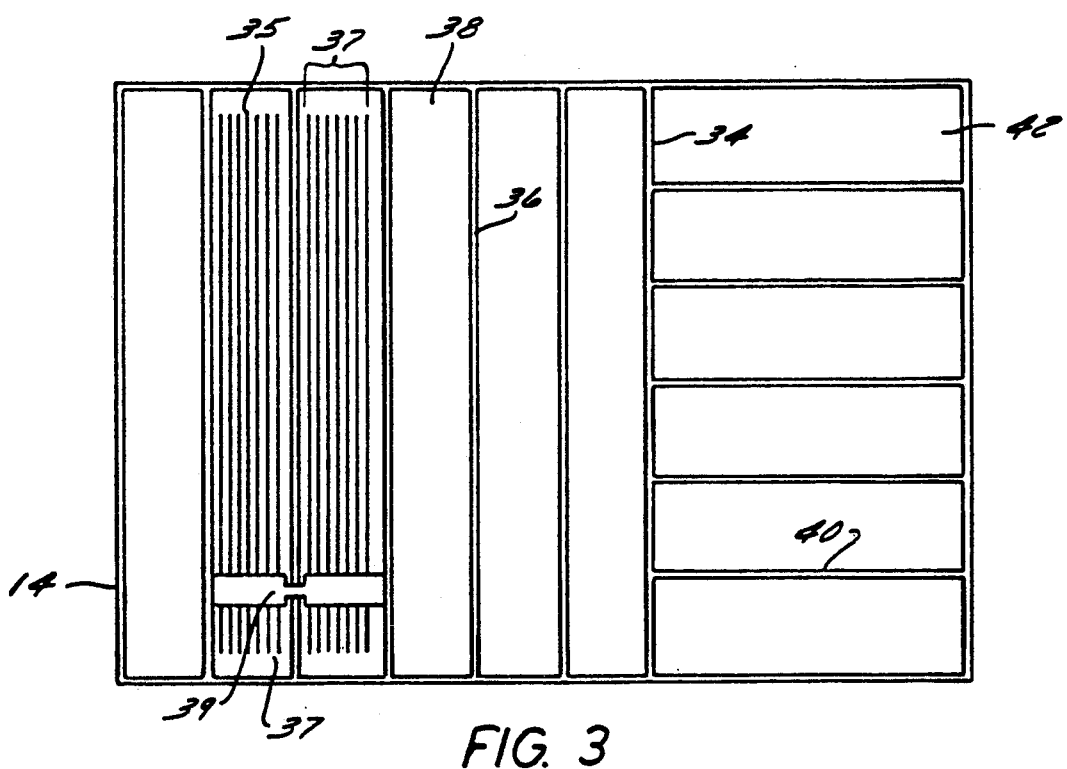
FIG. 3 is a top view of the container of FIG. 2 showing two exemplary battery cell elements hard-wired together.

Referring now to FIGS. 1-3, a dual battery 101 comprises a molded plastic housing 10 made from a cover 12 and container 14 joined together along a line 13 during manufacture, for example, by heat sealing. Container 14 has a wall 34 which divides the container into a main battery portion 11, including six main battery compartments (cells) 38, and a reserve battery portion 23, including six reserve battery cells 42. The main battery is disposed along a main battery centerline (axis) 20 such that the electrochemical cells comprising the main battery are disposed parallel to each other and perpendicular to centerline 20. The reserve battery is disposed at the right hand side of FIGS. 1-3. The individual cells of the reserve battery are perpendicular to a reserve centerline 22, reserve centerline 22 being transverse (i.e., not parallel) to main centerline 20.

Figure 5:
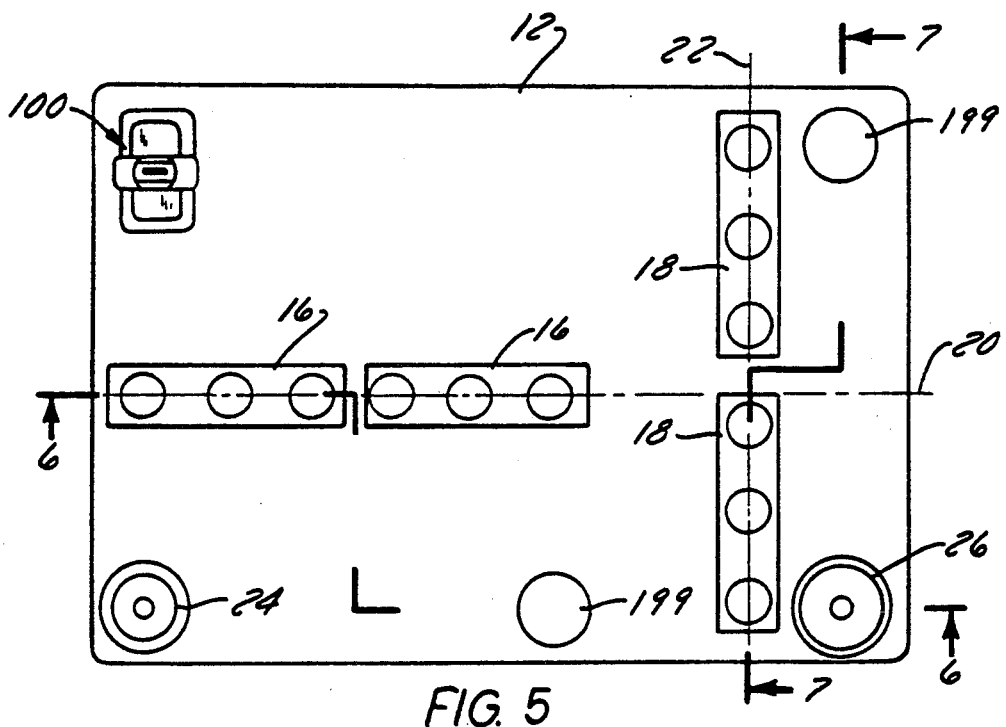
FIG. 5 is a top plan view of the battery shown in FIG. 1.
Figure 6:
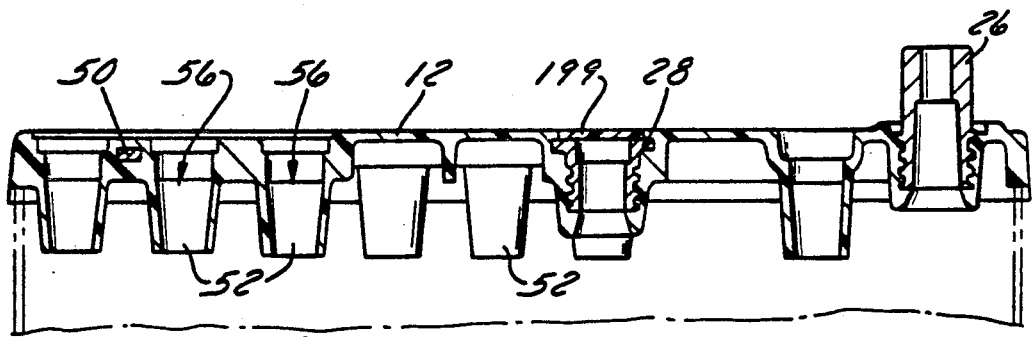
FIG. 6 is a cross-sectional view of the cover taken along line 6—6 in FIG. 5, with vent caps removed.
Figure 7:
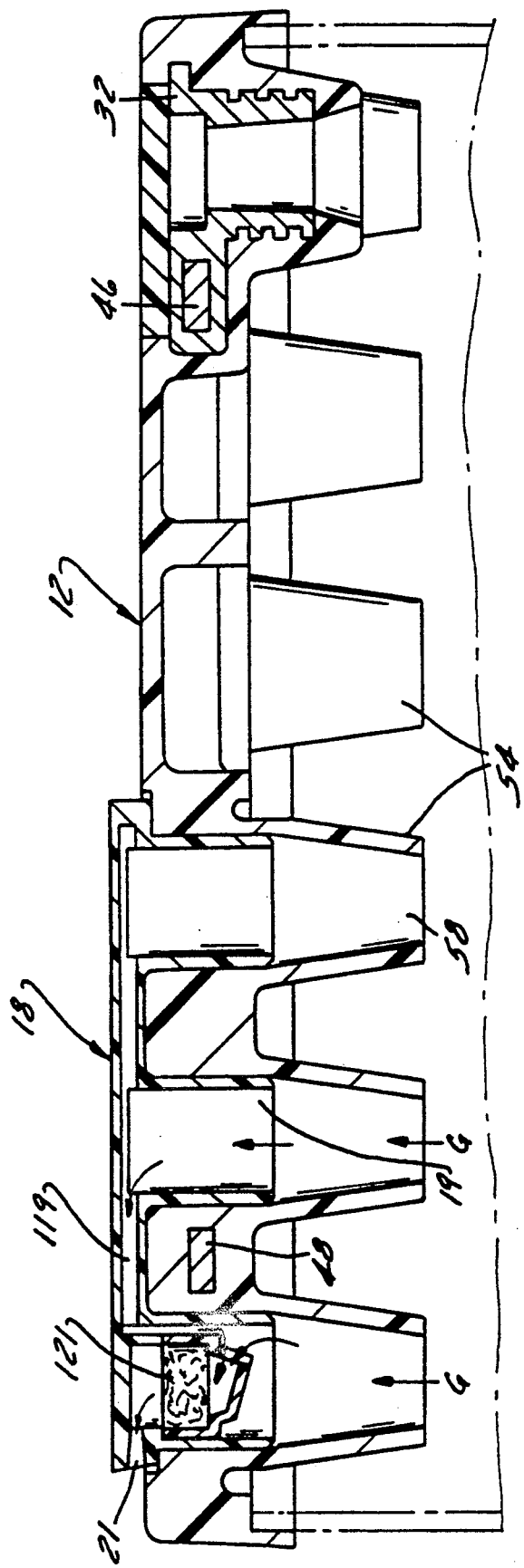
FIG. 7 is a cross-sectional view taken along line 7—7 in FIG. 5.

Referring to FIGS. 5-7, respective main battery multiple vent caps 16 are suitably inserted into main battery fill holes 56 along main centerline 20. Respective reserve battery vent caps 18 are similarly inserted into reserve fill holes 58 along reserve centerline 22. Each vent cap 16, 18 has an aperture 21 for venting the main and reserve batteries.

In accordance with conventional battery terminal configurations, a positive main battery terminal 24 extends from the upper surface of cover 12, near one corner along a longitudinal edge 30 thereof, to facilitate attachment to the positive battery cable of a vehicle. Along the same longitudinal edge 30 of cover 12, at the opposite corner, a negative terminal 26 of the reserve battery extends upwardly through cover 12 for attachment to the negative battery cable of the vehicle. With reference to FIGS. 1, 5 and 6, a negative battery termination 28 of the main battery is disposed near edge 30 of cover 12, but does not protrude therefrom. Similarly, a positive termination 32 of the reserve battery, disposed near a short edge 29 of cover 12, does not protrude therefrom. Respective access hole covers (burn caps) 199 are sealed to cover 12 to conceal terminations 28 and 32.

Dual battery 101 further includes bus bars 46, 48, 50 (FIGS. 6 and 7) which connect negative termination 28 to negative terminal 26 and connect positive termination 32 to positive terminal 24, so that power from both the main and reserve batteries can be drawn via terminals 24, 26. A manually-operable switch mechanism 100 can selectively interrupt the electrical connection between termination 32 and positive terminal 24. A one-way circuit (not shown) bypasses switch 100 and permits charging of the reserve battery when switch 100 is open. Such a circuit preferably includes a diode that permits current flow in only one direction and, preferably, a variable resistor to prevent overheating. The variable resistor is connected in series to the diode and increases in resistance with increasing current level.

Container 14 of housing 10 is divided into two separate battery chambers by partition wall 34. On the left side of wall 34, a plurality of thin, flat, parallel, evenly spaced-apart cell walls 36 define a plurality of main battery cell compartments (cells) 38 therebetween. Respective main battery frustoconical inlets 52, integral with cover 12, are disposed above and extend into each corresponding main battery cell 38 between adjacent walls 36 to form main fill holes 56 facilitating the introduction of electrolyte thereinto.

On the right hand side of wall 34, a plurality of similarly spaced reserve battery cell walls 40 define a series of reserve battery cell compartments 42 therebetween. Respective reserve battery frustoconical inlets 54 (FIG. 7) extend into respective compartments 42 to facilitate the introduction of electrolyte thereinto, which electrolyte may be the same as or different from the electrolyte employed in the main battery inasmuch as the two batteries are isolated by wall 34.

Vent caps 16, 18 may be similar or identical in structure and function. Vent cap 18 projects slightly above the surface of cover 12 to facilitate the removal of vent cap 18. As an alternative embodiment, battery cover 12 can be recessed in the vicinity of fill holes 56, 58 so that the tops of vent caps 16, 18 are substantially coplanar with the top surface of battery cover 12.

With reference to FIGS. 4 and 9-11, an exemplary embodiment of vent cap 18 (or 16) suitably comprises a plurality, e.g., three integral, hollow, barrel-shaped vent covers 302, 304, and 306 extending from a common supporting flange 303 in evenly spaced positions for disposition within inlets 54, as shown in FIG. 7. Each vent cover 302, 304, 306 includes a tubular side wall (barrel) 351, a top wall 352 from which flange 303 extends laterally, and a lower end opening 353. Endmost cover 306 additionally has a tubular inner wall 354 which extends downwardly from top wall 352 to form an annular shoulder 312. Adjacent covers 302, 304, 306 are connected by a common manifold passage 119 which extends lengthwise through flange 303 and communicates, through a series of internal passages and spaces 328, 330, 342, 332, and 344, with an aperture 21 disposed at one end of cap 18 proximate an endmost cover 306. Manifold 119 is suitably circular in cross-section with a diameter of 0.040 to 0.500 inches, preferably 0.085 inches.

Figure 13:
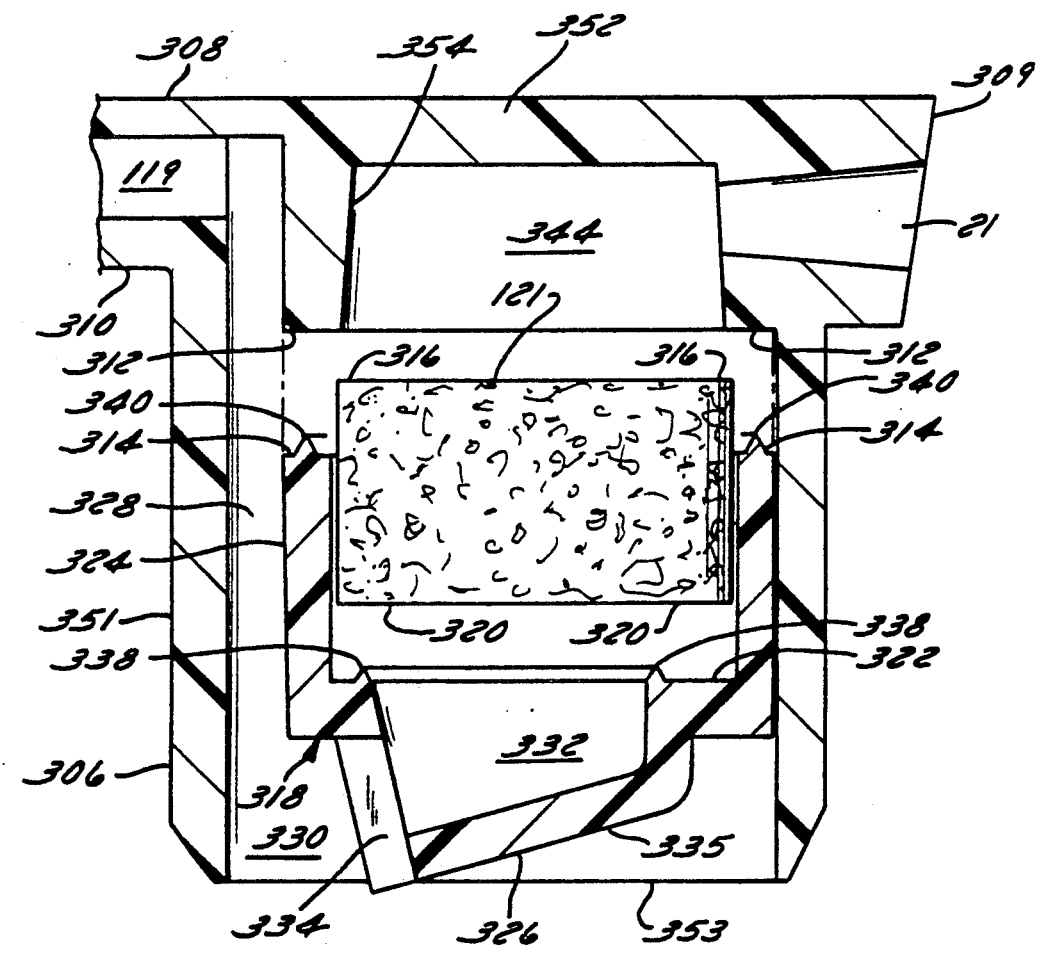
FIG. 13 is an enlarged, partial, lengthwise sectional view of a portion of the right end vent cap shown in FIG. 4, prior to mounting of the holder and flame arrestor, with various of the dimensions exaggerated for clarity.

Referring to FIG. 13, supporting flange 303 has a flat top wall 308, a flat bottom wall 310, and a side edge 309.

A flame arrestor 121 is secured within projection 306 by a cup-shaped base member (holder) 318. Holder 318 suitably comprises a tubular side wall 324 terminating at a radially inwardly extending, annular bottom flange (shelf) 322. A splash guard 326 depends from the underside of holder 318 and is integral therewith. Splash guard 326 comprises a tubular, slightly downwardly tapering side wall 334 which extends from near the inner periphery of shelf 322 and terminates in a sloped bottom wall 335. Bottom wall 335 slopes towards a lateral opening 342 in side wall 334 through which gases are admitted to the hollow interior of holder 318 from the battery cell. Opening 342 spans bottom 335 and the underside of shelf 322, and preferably extends approximately 10°–160° about the circumference of splash guard 326.

Figure 10:
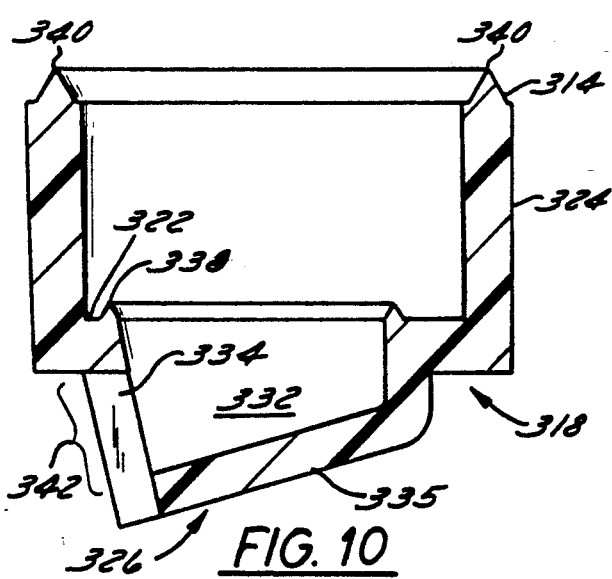
FIG. 10 is a lengthwise sectional view of the flame arrestor holder shown in FIG. 4 prior to assembly with the vent cover.
Figure 12:
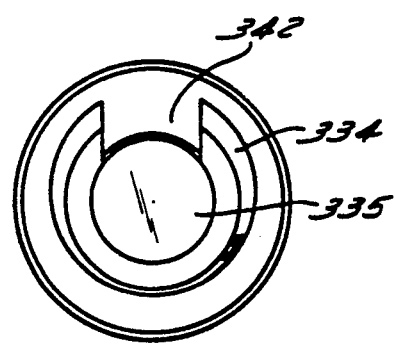
FIG. 12 is a bottom view of the holder shown in FIG. 10.

Referring now to FIGS. 10 and 13, a weld rib 338 protrudes from the upper surface of shelf 322. Similarly, the upper end surface 314 of sidewall 324 has an upwardly projecting annular rib 340. During assembly of vent cap 18, disc 121 is first welded within cup-shaped holder 318, and holder 318 is inserted into cover 306. Disc 121, holder 318, and shoulder 312 are then friction welded together at rib 340. More particularly, a 360° weld is desirably obtained at the following three interfaces: (1) between an upper, outer annular surface 316 of disc 121 and annular shoulder 312; (2) between upper surface 314 of sidewall 24 and shoulder 312; and (3) between a lower outer annular surface 320 of disc 121 and shelf 322. Ribs 338 and 340 melt during the welding process to fuse disc 121 and holder 318 within cover 306, thereby forming a liquid- and gas-tight seal preventing direct communication between manifold 119 and aperture 21.

Figure 4:
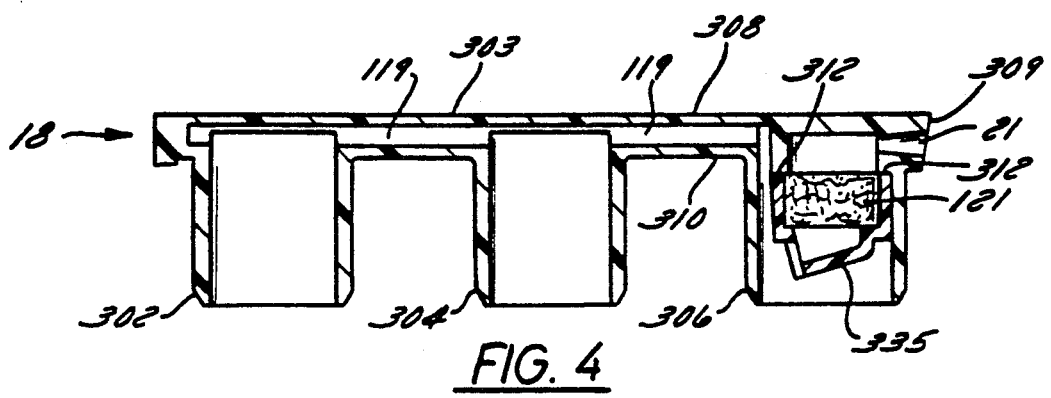
FIG. 4 is a lengthwise sectional view of a reserve vent cap shown in FIG. 1.

As shown in FIG. 4, cap 18 (or 16) is configured to minimize electrolyte leakage from the battery cells to the environment by providing a circuitous path for gas flow which forces gas upwardly through flame arrestor 121. At the same time, each cell communicates with the external environment, through passage 119 and aperture 21, thereby preventing excessive pressures within the battery resulting from gas generation due to overcharging or self discharging or changes in temperature. Specifically, gas is often generated during the charging and discharging of the battery, which gas must be ventilated to prevent pressure build up. Moreover, changes in ambient temperature and humidity tend to increase internal battery pressure even when the battery is dormant.

Flame arrestor 121 is incorporated into one or more of vent covers 302, 304, 306 to prevent an external source of ignition such as a flame or a spark, from entering the battery. Flame arrestor 121 suitably comprises a microporous polyethylene disc, but may also be made from polypropylene, ceramic, or any suitable material which is permeable to gases produced inside a battery, yet impermeable to flames.

In the embodiment shown in FIG. 4, a single flame arrestor 121 is incorporated into cover 306 in each multiple vent cap 18, although respective flame arrestors may be disposed in more than one vent cover, as may be desired, for example, in an embodiment wherein two apertures 21 are located at opposite ends of the vent cap. Proper positioning of flame arrestor 121 proximate aperture 21 ensures that any flame which may be inadvertently produced by an external source is prevented from entering any of the battery cells, thereby minimizing the risk of gas ignition within the battery. Respective vent caps 16 cooperate with main battery inlets 52 in a similar manner.

With continued reference to FIGS. 4 and 13, gases released from within the respective battery cells corresponding to covers 302, 304, 306 are liberated from the battery through aperture 21 in a manner which substantially prevents electrolyte leakage from the battery. In addition, mechanical complexity and production costs for the cap are reduced because a single flame arrestor is advantageously configured to protect a plurality of cells from external sources of flame. Further, by providing the flame arrestor within one of the vent covers, the need for a separate labyrinth and flame arrestor is eliminated.

Gas (G) released from battery cells corresponding to one or both of covers 302, 304 can exit only through manifold 119 by flowing in the direction of the arrows in FIG. 7. The 360° weld between upper surface 314 of holder 318 and shoulder 312 of cap 18, and the 360° weld between disc 121 and each of shoulder 312 and shelf 322, prevents gas from escaping through aperture 21 without first passing through flame arrestor 121. As shown in FIGS. 4 and 13, manifold 119 extends along the underside of supporting flange 303, terminating at a downwardly extending passage 328 between walls 324, 354 and wall 351 within cover 306. Passage 328 maintains gaseous communication between manifold 119 and a lower space 330 of cover 306.

Additional gas from the cell corresponding to cover 306 enters space 330 through opening 353 and mixes with any gas from passage 328. The gases travel through opening 342 and into a lower space 332 within holder 318, between splash guard 326 and disc 121. The gases then permeate through porous disc 121 and into an upper discharge space 344 between top wall 352 and disc 121 before exiting cap 18 via lateral aperture 21 formed in edge 309 of flange 303.

Disc 121 advantageously forms a physical barrier between discharge space 344 and the interior of the battery, including respective covers 304–306 and the cells corresponding thereto. Consequently, disc 121 protects the battery from flame from external sources inasmuch as disc 121 is permeable to gas, but impermeable to flame. To the extent flame may contact gas within discharge space 344, the relatively small volume of space 344 renders such contact inconsequential.

A further aspect of the present invention surrounds the ability of the foregoing configuration to prevent aqueous electrolyte from leaking out of the battery during vehicle motion when the battery is in a generally upright position. As discussed above, respective covers 302, 304, 306 are received within respective inlets 52, 54 when caps 16, 18 are secured in cover 12 (FIG. 7). Electrolyte which splashes upwardly from battery cells corresponding to covers 302 or 304 cannot exit cap 18. Such electrolyte contacts the inside sidewall of cover 302 or 304 and drips back into the battery cell. In the event electrolyte is splashed into manifold 119, such eventually drips down a sidewall of one of the covers and into a battery cell.

Electrolyte splashed from the cell corresponding to cover 306 is prevented from leaking from the battery by holder 318 and disc 121. In addition, splash guard 326 minimizes the extent to which electrolyte contacts disc 121. By minimizing contact between aqueous electrolyte and disc 121, the flow of gas through disc 121 and out of the battery remains relatively unimpeded. Window 342 is large enough to allow the gases to freely flow from space 330 to space 332. On the other hand, window 324 minimizes the amount of electrolyte which enters space 332. Electrolyte which nonetheless enters space 332 falls onto the upper surface of bottom wall 335 and drips through window 342, back into the battery cell.

The foregoing configuration presents significant advantages over many prior art configurations in which the gases flow downwardly through the flame arrestor disc before leaving the battery. In such configurations, electrolyte which splashes onto the upper surface of the disc may be "pumped" through the disc as the gases increase internal battery pressure. The present invention allows the gases to proceed upwardly through the disc and, in conjunction with the foregoing splash protection features, minimizes the likelihood that electrolyte may be "pumped" from the battery.

Figure 8:
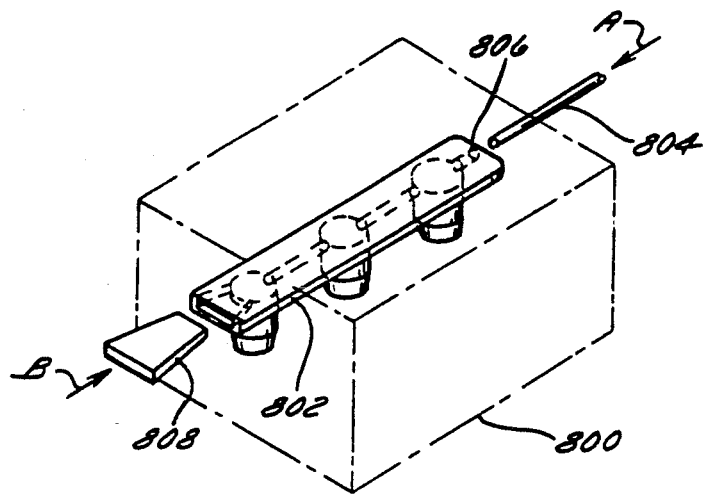
FIG. 8 is an exploded perspective view of an injection molding apparatus according to the invention.
Figure 9:
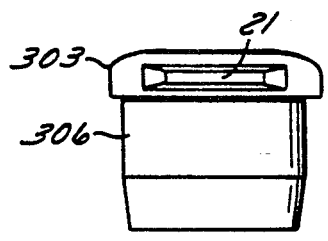
FIG. 9 is an end view of the vent cap shown in FIG. 4.
Figure 11:
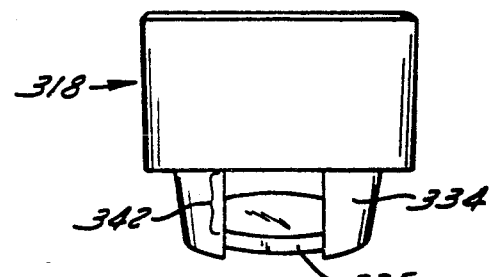
FIG. 11 is a left side elevational view of the holder shown in FIG. 10.

Referring now to FIG. 8, caps 16, 18 may be formed as an integral unit, for example, by injection molding. A mold 800 has an internal cavity 802 substantially defining the shape of cap 16 or 18. A plurality of pins (not shown), corresponding to the internal shapes of covers 302, 304, 306, are disposed in or made integral with the mold. A thin, elongated rod 804 is inserted along arrow A into an opening 806 of mold 800, terminating at passage 328 (see FIG. 13). A fan-shaped wedge (maker) 808 is guided into mold 800 along arrow B. Plastic is thereafter injected into the mold at high temperature and pressure.

Upon cooling of the plastic (e.g., 30-60 seconds), rod 804 and wedge 808 are withdrawn from mold 800 thereby forming manifold 119 and aperture 21, respectively. Cap 18 is thereafter ejected from mold 800 for further processing. Subsequently, the hole created by rod 804 (at the left end of cap 18 in FIG. 4) is sealed.

Holder 318 may be simlarly manufactured by any conventional molding process, such as injection molding. Flame arrestor 121 is placed within holder 318 and secured in place, by heat sealing, sonic welding, friction welding, an adhesive, electrical conduction fusion, or the like. Holder 318 is then secured to shoulder 312 by any of the aforementioned methods.

It will be understood that the above description is of preferred exemplary embodiments of the present invention, and that the invention is not limited to the specific forms shown. For example, a series of single vent caps each having its own flame arrestor and aperture 21 could be used instead of a multiple vent cap wherein gases from several cells are fed through a common flame arrestor. Aperture 21 is advantageously formed in the side edge of flange 303 to prevent contamination of the battery by substances entering through aperture 21. However, with suitable shielding, aperture 21 could be formed directly through top wall 352. These and other substitutions, modifications, changes, and omissions may be made in the design and arrangement of the elements without departing from the spirit of the invention as expressed in the appended claims.

We claim:

1. An apparatus for use with a battery vent cap, said vent cap having a top and a barrel and being configured to sealingly engage a battery fill-hole, said barrel having a longitudinal axis and defining a cavity, said cavity being bounded at a first end by said top and being open at a second end; said cavity comprising a first chamber adjacent said first end and a second chamber adjacent said second end, said barrel presenting an interior shoulder intermediate said first chamber and said second chamber, said vent cap further including a vent means to said first chamber for effecting fluid communications with said first chamber from without said vent cap; the apparatus comprising:
a flame arrestor means for impeding passage of flames; and
a holder means for holding said flame arrestor means;
said holder means being generally cup-shaped and defining a well having an open upper end and a bottom at a lower end, said upper end being generally registrable with said interior shoulder, said bottom being penetrated by at least one aperture, said flame arrestor means being affixed within said well in a manner to force fluid flowing through said well to pass through said flame arrestor means; said holder means being configured appropriately to facilitate insertion of the apparatus substantially fully within said barrel with said upper end and said interior shoulder in a registered abutting orientation.

2. An apparatus for use with a battery vent cap as recited in claim 1 wherein said holder means further includes splash interference means for interfering with entry of liquids through said at least one aperture, said splash interference means substantially blocking passage of liquids to said at least one aperture along said longitudinal axis, said splash interference means being configured to facilitate drainage of liquids emanating from said at least one aperture.

3. An apparatus for use with a battery vent cap as recited in claim 2 wherein said splash interference means is integrally formed with said holder means.

4. An apparatus for use with a battery vent cap as recited in claim 1 wherein said vent cap is integrally formed in a ganged assembly, said vent cap sealingly engaging a home fill-hole and said ganged assembly including a plurality of additional vent cap means for sealingly engaging a plurality of additional fill-holes, said ganged assembly including vias for effecting fluid communications between said home fill-hole and each of said plurality of additional fill-holes when said ganged assembly is installed in said battery.

5. An apparatus for use with a battery vent cap as recited in claim 2 wherein said vent cap is integrally formed in a ganged assembly, said vent cap sealingly engaging a home fill-hole and said ganged assembly including a plurality of additional vent cap means for sealingly engaging a plurality of additional fill-holes, said ganged assembly including vias for effecting fluid communications between said home fill-hole and each of said plurality of additional fill-holes when said ganged assembly is installed in said battery.

6. An apparatus for use with a battery vent cap as recited in claim 3 wherein said vent cap is integrally formed in a ganged assembly, said vent cap sealingly engaging a home fill-hole and said ganged assembly including a plurality of additional vent cap means for sealingly engaging a plurality of additional fill-holes, said ganged assembly including vias for effecting fluid communications between said home fill-hole and each of said plurality of additional fill-holes when said ganged assembly is installed in said battery.

7. An apparatus for use with a battery vent cap as recited in claim 4 wherein at least one of said additional vent cap means is configured substantially the same as said vent cap.

8. An apparatus for use with a battery vent cap as recited in claim 5 wherein at least one of said additional vent cap means is configured substantially the same as said vent cap.

9. An apparatus for use with a battery vent cap as recited in claim 6 wherein at least one of said additional vent cap means is configured substantially the same as said vent cap.

10. A vent cap disposable within a battery fill hole for venting gases from within the battery, comprising:
- a first vent cover having a top wall, a tubular side wall extending from the top wall and terminating in an opening proximate a lower end of the first cover, the side wall enclosing an interior space which extends from the top wall to the lower opening;
- a lateral flange extending from the top wall of the vent cover;
- an aperture which allows communication between an upper exterior surface of the cap and the interior space of the first cover;
- a flame arrestor disposed in the interior space of the first vent cover so that gases entering the first vent cover through the open lower end thereof must pass through the flame arrestor in order to exit through the aperture;
- a tubular holder securing the flame arrestor to the first vent cover, the holder being secured within the interior space of the first vent cover in communication with the aperture, the holder having means for retaining the flame arrestor in said holder and a window for admitting gases to the interior of said holder; and
- a second vent cover extending from the flange at a position spaced from the first vent cover having the flame arrestor therein, the flange having a manifold passage allowing gases generated within a cell associated with the second cover to enter the first vent cover through a space between the side wall of the first cover and the holder which forms a downwardly directed passage allowing communication between the manifold passage in the flange and the window of the holder, permitting venting of gases from the second vent cover through the flame arrestor and aperture in the first vent cover.

11. The vent cap of claim 10, wherein the aperture extends through the flange and opens on a peripheral side edge of the flange.

12. The vent cap of claim 10, wherein the holder includes a splash guard configured to block splashed aqueous electrolyte from within an adjacent battery cell from contacting the flame arrestor.

13. The vent cap of claim 10, wherein the holder has a radially inwardly extending annular shelf, and the flame arrestor is disposed in said holder on said shelf.

14. The vent cap of claim 10, wherein the first vent cover has a generally tubular inner wall extending downwardly from the top wall of the cover, an upper surface of the holder is secured in a gas-tight seal to a bottom shoulder of the inner wall, and the aperture communicates directly with an interior space of the inner wall.

15. The vent cap of claim 14, further comprising means for securing the flame arrestor at its upper end to the bottom shoulder of the inner wall of the cover, and at its lower end to an inner face of the shelf of the holder.

16. The vent cap of claim 10, wherein the flame arrestor comprises a microporous disc.

17. The vent cap of claim 16, wherein the flame arrestor is made of polyethylene.

* * * * *